(12) United States Patent
Siders et al.

(10) Patent No.: US 9,989,187 B2
(45) Date of Patent: Jun. 5, 2018

(54) TUBE STRAIN RELIEVERS

(71) Applicants: Randy Siders, West Des Moines, IA (US); Brandon Phillip Williams, Urbandale, IA (US); David H. Bretz, West Des Moines, IA (US)

(72) Inventors: Randy Siders, West Des Moines, IA (US); Brandon Phillip Williams, Urbandale, IA (US); David H. Bretz, West Des Moines, IA (US)

(73) Assignee: Delavan Inc., West des Moines, IA (US)

( * ) Notice: Subject to any disclaimer, the term of this patent is extended or adjusted under 35 U.S.C. 154(b) by 1205 days.

(21) Appl. No.: 13/913,988

(22) Filed: Jun. 10, 2013

(65) Prior Publication Data
US 2014/0361531 A1    Dec. 11, 2014

(51) Int. Cl.
*F16L 57/00*    (2006.01)
*F16L 35/00*    (2006.01)

(52) U.S. Cl.
CPC ............. *F16L 57/005* (2013.01); *F16L 35/00* (2013.01)

(58) Field of Classification Search
CPC ......... F16L 13/04; F16L 13/06; F16L 57/005; F16L 57/02
USPC ......................................... 285/114, 115, 116
See application file for complete search history.

(56) References Cited

U.S. PATENT DOCUMENTS

| | | | | |
|---|---|---|---|---|
| 1,463,244 A | * | 7/1923 | Bogard | B60L 5/06 191/64 |
| 4,514,241 A | * | 4/1985 | Maukola | F16L 59/16 138/155 |
| 4,632,488 A | * | 12/1986 | Long | H01R 13/58 439/448 |
| 4,943,278 A | * | 7/1990 | Euteneuer | A61M 25/0662 604/913 |
| 5,169,386 A | * | 12/1992 | Becker | A61F 2/04 600/435 |
| 5,181,750 A | * | 1/1993 | Reum | F16L 35/00 285/115 |
| 5,304,132 A | * | 4/1994 | Jang | A61M 25/1027 604/101.01 |
| 5,466,230 A | * | 11/1995 | Davila | A61M 25/0662 138/110 |
| 6,068,622 A | * | 5/2000 | Sater | A61M 25/0009 604/524 |
| 6,228,073 B1 | * | 5/2001 | Noone | A61M 25/0014 128/912 |
| 6,273,404 B1 | * | 8/2001 | Holman | A61M 25/0009 264/259 |

(Continued)

FOREIGN PATENT DOCUMENTS

| EP | 0415690 B1 | 3/1991 | | |
|---|---|---|---|---|
| EP | 0720752 B1 | 7/1996 | | |
| GB | 2091498 A | * | 7/1982 | F16L 5/06 |

*Primary Examiner* — James M Hewitt, II
(74) *Attorney, Agent, or Firm* — Locke Lord LLP; Scott D. Wofsy; Christopher J. Cillié

(57) ABSTRACT

A strain reliever for a hollow tube is disclosed. The strain reliever has a fitting dimensioned to fit at a tube segment and a tapered sleeve extending from the fitting. The tapered sleeve is configured to surround the tube segment and to provide relief of strain imposed by forces exerted on the tube. Strain relievers having helical conic and slotted tapered sleeves are also described.

15 Claims, 3 Drawing Sheets

(56) References Cited

U.S. PATENT DOCUMENTS

| | | | |
|---|---|---|---|
| 7,486,994 B2* | 2/2009 | Zarembo | A61N 1/056 607/116 |
| 2001/0011177 A1* | 8/2001 | Peterson | A61M 25/0014 606/192 |
| 2004/0091321 A1* | 5/2004 | Bastard | F16L 57/02 405/168.2 |

* cited by examiner

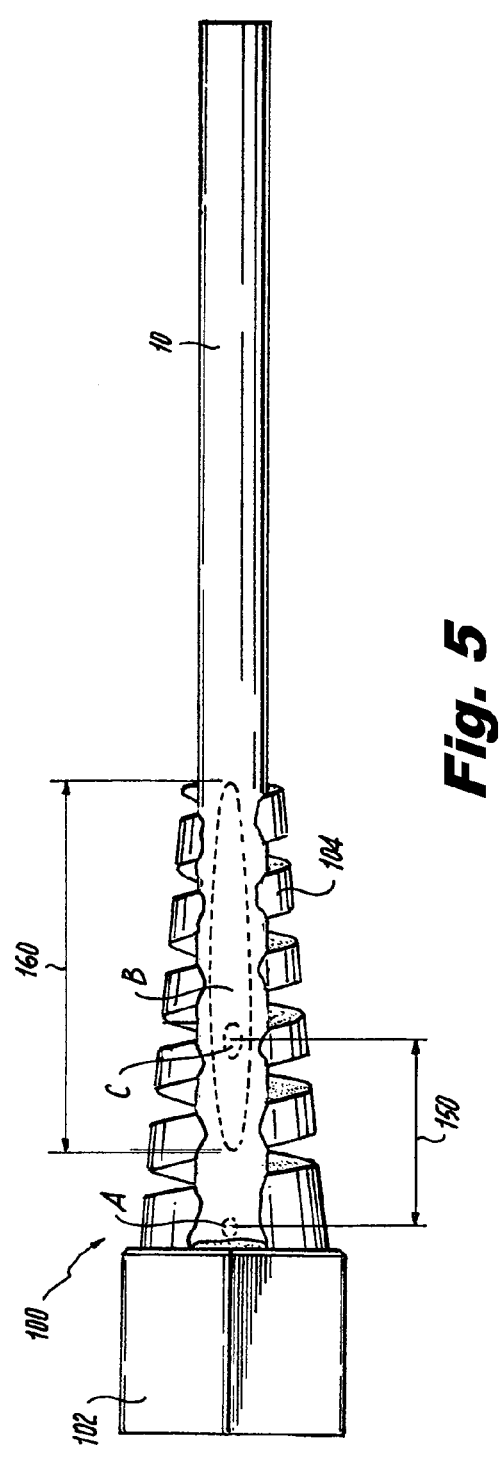
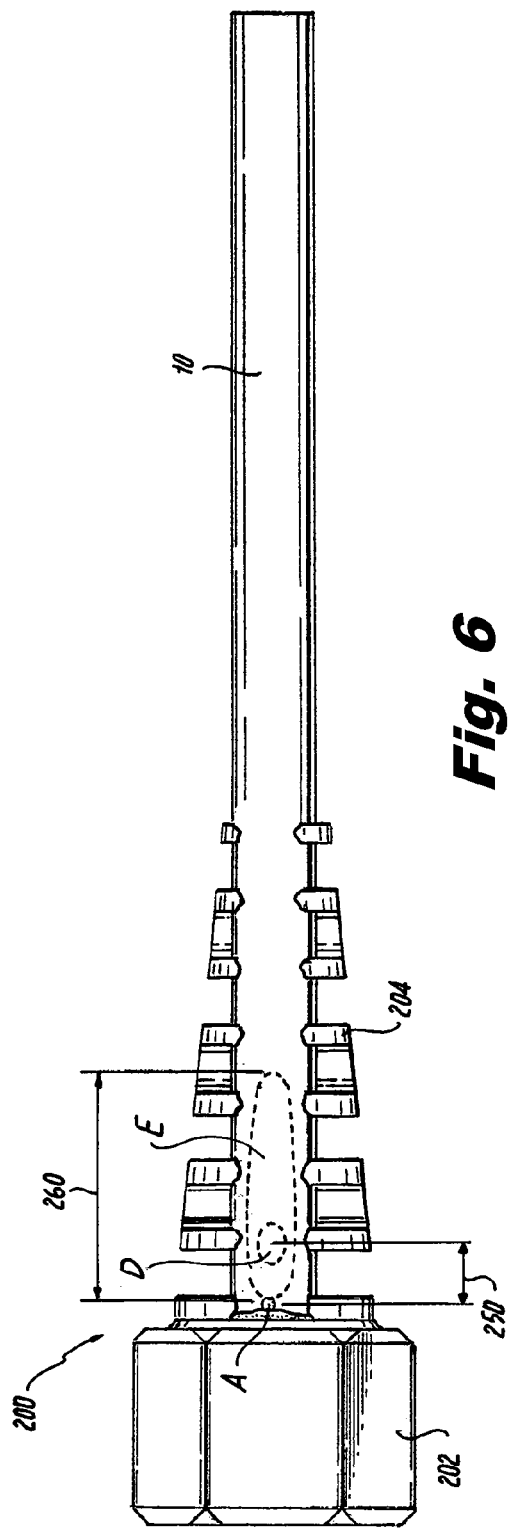
Fig. 5
Fig. 6

TUBE STRAIN RELIEVERS

BACKGROUND OF THE INVENTION

1. Field of the Invention

The subject invention relates to mechanical strain relief, and more particularly to strain relievers for tubes.

2. Description of Related Art

Metal tubing is used throughout gas turbine engines, e.g. for aircraft engine fuel injector test instrumentation like thermocouples and strain gauges. These gauges are typically coupled through thin-walled metal tubing to measurement instruments. The tubing can convey hot gases, liquids or fuel between sampling points and measurement instruments, and typically terminates at a junction where a joint boss welded or brazed to the tubing terminates the tubing run.

When a tube is subjected to repeated physical forces that exert bending forces or strain on the tube, the tube or tube joint can break. This is because a force applied at a distance from a tube junction has maximum effect on the tube at the tube wall portion adjacent the junction. Fatigue damage from tube vibration also accumulates most rapidly at the tube wall portion adjacent the tube junction as the junction fixes and damps the tube at the junction, thereby forcing the tube to flex at the tube wall portion. These forces are particularly problematic for test instrumentation of engines where the temporary installations may experience rough handling and the vibratory provisioning provided for tubing permanently installed in the engine. And in the case of a welded or brazed tube junction, the tube wall immediately adjacent the junction may also be of inferior strength compared to the remainder of the tube due to heat exposure during the joint boss attachment process or the material composition of the joint. These tubes therefore tend to shear off at the tube junction or termination due to the concentration of stress in these locations.

While the traditional techniques have been satisfactory for their intended purpose, there is a need for improved strain relief method and devices for tubes and tube junctions. There is also a continuing need for tube and tube junction strain relief methods and devices that are easy to make and use. The present invention provides a solution for these problems.

SUMMARY OF THE INVENTION

The subject invention is directed to a new and useful strain reliever for a hollow tube that includes a fitting and a tapered sleeve. The fitting can be dimensioned to fit a hollow tube segment or at a distal end of the hollow tube. The tapered sleeve attaches to the fitting and extends proximally therefrom, and can be configured to surround a distal end portion of the tube to provide relief of strain on the tube. It is contemplated that the tapered sleeve can be defined by a helical conic sleeve or a slotted conic sleeve. It accordance with an embodiment, the slotted conic sleeve is a series of alternating slots formed along a length of the sleeve.

In certain embodiments the tapered sleeve includes an axially extending bore with a constant diameter. In accordance with embodiments, the diameter can be dimensioned to fit tightly around the tube segment. The diameter can also be dimensioned to be about equal to an outer diameter of the tube segment. The diameter can further be dimensioned to be greater than the outer diameter of the tube segment.

In embodiments, the tapered sleeve is coupled to the fitting with brazed or welded joint, or with a threaded interface. It is also contemplated that the tapered sleeve and fitting be integrally formed from a single piece of material.

In embodiments, the tapered sleeve is configured and adapted to couple to the tube segment with a brazed, welded or epoxy joint. It is further contemplated that the tapered sleeve be integrally formed on the tube segment, such as by machining the tapered sleeve into the surface of the tube segment.

These and other features of strain relievers will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art will readily understand how to make and use the methods and devices disclosed herein without undue experimentation, the methods and devices will be described in detail herein below with reference to certain figures, wherein:

FIG. 5 is a cross-sectional side elevation view of the strain reliever of FIG. 2, schematically showing the stress distribution across the tube surface created by the strain reliever in response to a force exerted on the tube; and FIG. 6 is a cross-sectional side elevation view of the strain reliever of FIG. 4, schematically showing the stress distribution across the tube surface created by the strain reliever in response to a force exerted on the tube.

DETAILED DESCRIPTION OF PREFERRED EMBODIMENTS

Figure 1:
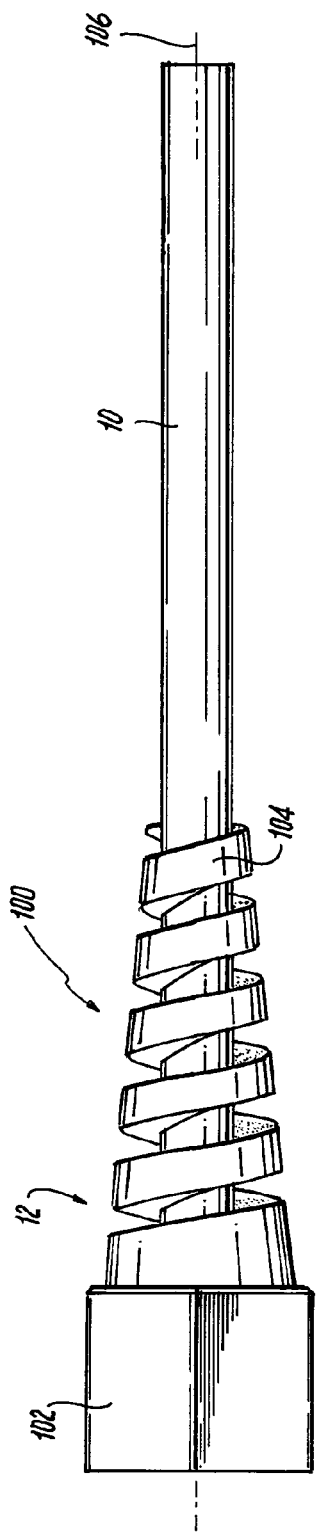
FIG. 1 is a side elevation view of an exemplary embodiment of a strain reliever, showing a tapered sleeve in the form of a helical conic sleeve fitted to a tube.

Reference will now be made to the drawings wherein like reference numerals identify similar structural features or aspects of the subject invention. For purposes of explanation and illustration, and not limitation, a partial view of an exemplary embodiment of a strain reliever in accordance with the invention is shown in FIG. 1 and is designated generally by reference character 100. Other embodiments in accordance with the invention, or aspects thereof, are provided in other figures, as will be described. The strain relief devices described herein can be used high temperature environments such as in aerospace and automotive applications where tubes conveying fluids or couplings to measurement instruments, such as thermocouples or strain gauges for example, are subject to forces that could otherwise fail. Failure of such tubing can jeopardize equipment operation and/or acquisition of measurement information.

Referring now to FIG. 1, a strain reliever 100 for a hollow tube is shown. Strain reliever 100 includes a fitting 102 and a tapered sleeve 104. Tapered sleeve 104 couples to fitting 102 on a side of fitting 102, and extends proximally therefrom. In an embodiment, tapered sleeve 104 couples to fitting 102 with a brazed or welded joint. In an exemplary embodiment, tapered sleeve 104 and fitting 102 respectively define corresponding male and female threaded bodies that join to define a threaded interface. The threaded interface fixedly couples sleeve 104 and 102 to form a strain reliever assembly. As would be appreciated, sleeve 104 and fitting 102 can also be integral, such as being formed by machining fitting 102 and tapered sleeve 104 from a single piece of material, for example.

With further reference to FIG. 1, strain reliever 100 is shown attached to a tube segment 10. In the illustrated embodiment, strain reliever 100 attaches to a distal end 12 of the tube segment 10. Tube 10 defines an axis 106, fitting 102, tapered sleeve 104, and tube 10 being coaxially aligned with respect to one another along axis 106. Fitting 102 is further dimensioned to fit tube segment 10 so as to couple thereto, such as by a brazed or welded joint, swaging, or with a threaded interface between fitting 102 and distal end portion 12. As will be appreciated, fitting 102 can also be dimensioned so as the circumferentially surround tube segment 10 such that the tube segment extends without interruption across fitting 102, such as when tube 10 passes through a bulkhead or other structural member. As will also be appreciated, tube 10 can be constructed of any material suitable for conveying fluid or instrument couplings in a given application, such as stainless steel for example. Fitting 102 and sleeve 104 can be constructed of materials suitable for attachment to tube 10 by brazing or welding, such as brass or stainless steel for example.

In embodiments, tapered sleeve 104 is movably coupled to tube segment 10. For example, a bore 116 (shown in FIG. 2) in the interior of tapered sleeve 104 and extending along axis 106 can have a constant diameter dimensioned to tightly fit around tube segment 10. Bore 116 can also have a diameter about equal to an outer diameter of tube segment 10. Bore 116 can also have a diameter larger than the outer diameter than tube 10, thereby providing tube strain relief and allowing for tube geometry changes such as from thermal expansion, for example.

In embodiments, tapered sleeve 104 is configured and adapted to be fixedly coupled to tube segment 10. For example, tapered sleeve 104 can couple to tube segment 10 by a brazed or welded joint, for example. Tapered sleeve 104 can also couple to tube segment by a bond portion, such as with a series of epoxy stakes extending along the periphery of the sleeve to tube surface interface. In an embodiment, sleeve 104 is integrally formed with tube segment 10 by machining tapered sleeve 104 into the surface of tube segment 10. As will be appreciated, other forms of attachment of sleeve 104 to tube segment 10 are possible.

Fitting 102 can be a conventional fitting. For example, in one embodiment, fitting 102 is Swagelok® fitting. In another embodiment, fitting 102 is a beam seal fitting conforming to SAE AS85421 or similar specifications. In yet another embodiment, fitting 102 is a flare fitting conforming to SAE AS4395 or similar specifications. In still another embodiment, fitting 102 has a male or female threaded body portion conforming to National Pipe Thread Taper or similar standards. As will be appreciated, fitting 102 may conform to one of the above-listed fitting specifications on its distal face (left side of fitting 102 as illustrated in FIG. 1), and be modified on its opposed proximate face to receive tapered sleeve 104. As will be appreciated, fitting 102 can also be a joint boss. Advantageously, embodiments of strain reliever 100 having a modified fitting are readily received at 'stock' junctions and provide strain relief to tubing coupled to the junction be the strain reliever.

Figure 2:
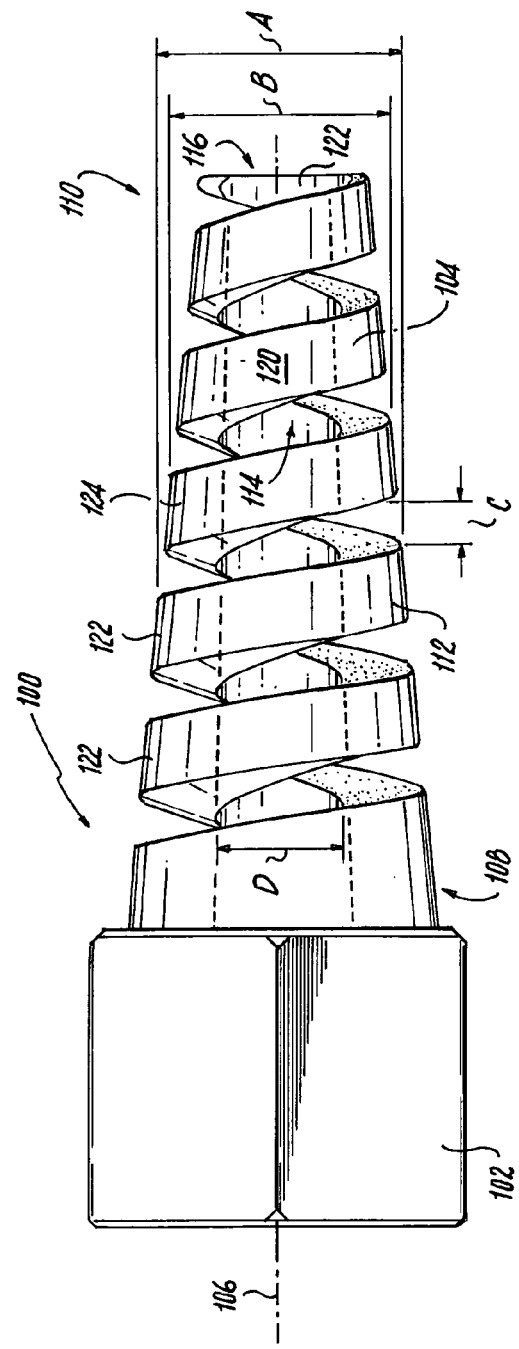
FIG. 2 is a side elevation view of the strain reliever of FIG. 1, showing the helical conic sleeve.

Referring now to FIG. 2, strain reliever 100 is shown detached from tube 10. Sleeve 104 defines a tapered shape extending proximally from fitting 102 along axis 106. In the illustrated embodiment, sleeve 104 defines a helical conic profile extending along axis 106 that progressively narrows as it extends proximally from fitting 102. With respect to FIG. 2, sleeve 104 extends proximally from fitting 102 between a first end 108 and a second end 110 along axis 106. Sleeve 104 is also configured to surround distal end portion 12 of tube 10 as shown in FIG. 1, and to provide relief of strain exerted on tube 10, such as by vibration or forces applied to tube segment 10 orthogonally with respect to axis 106 for example.

Sleeve 104 is formed of a body 112 defining a succession of twists 122 and 124 and extending proximally from fitting 102, thereby defining the helical shape. Successive twists 122 and 124 of body 112 have progressively smaller outer diameters, diameter A for example being larger than diameter B. In the illustrated embodiment, body 112 has five twists (not numbered in FIG. 2 for simplification purposes), twists 122 and 124 being separated by a gap C having a fixed width. In the illustrated embodiment, each twist is separated by a gap of about the same width. As will be appreciated, embodiments of strain reliever 100 can have a smaller or greater number of twists, twist thicknesses, and gap widths as suitable for a given application of strain reliever 100. As will further appreciated, gap widths and twist thicknesses may be varied to distribute strain (stress) along the surface of tube segment 10 as suitable in a given application of strain reliever, such as be unequal gaps between successive twists, etc.

Body 112 of sleeve 104 has an inner surface 114. Inner surface 114 is parallel with respect to axis 106 and defines a central bore 116. Central bore 116 has a length extending between first and second ends 108 and 110. Central bore 116 also has a diameter D defined by each respective twist of body 112 between first and second ends 108 and 110, and is dimensioned to fit tightly around distal end portion 12 (shown in FIG. 1) of tube 10. In an exemplary embodiment the outside diameter of tube 10 is slightly greater than diameter D, the interface of tube outer surface and inner surface 114 defining an interference fit.

Body 112 of sleeve 104 also has an outer surface 120. Outer surface 120 defines a frusto-conical shape, the outer surface of body 112 having a larger diameter at first end 108 and a smaller diameter at second end 110. Outer surface 120 also terminates at a flat surface segment arranged orthogonally with respect to axis 106, body 112 thereby having a truncated helical conic shape.

Operatively, strain reliever 100 provides relief of strain (stress) on tube segments where a portion of the tube is fixed and the tube segment experiences strain from being pulled or moved in a direction that would normally break the tube from bending, fatiguing, or shearing the tube. It does so by spreading the force that ordinarily be concentrated in the vicinity of where the tube in fixed, e.g. a termination point, along the contacting interface between the tapered sleeve and tube surface. Strain (stress) is reduced as a function of the length of the tapered sleeve, thereby increasing the maximum level of force that can be exerted on the tube before failure and the amount of fatigue that the tube can withstand. As will be appreciated, the size and geometry of the helix can be selected (or defined) as suitable to balance and/or keep the strain below a predetermined level for a given application, such as for rigid tube segments. Advantageously, in embodiments of strain reliever 100 having a spiral tapered sleeve 104 surrounding the tube, the sleeve redistributes strain relatively uniformly irrespective of the radial orientation of force applied to tube 10. This is due to the spiral arrangement of tapered sleeve 104, which provides an opposing surface in mechanical contact with the tube surface on an opposite side of axis 106 irrespective of the radial orientation of the applied force.

Figure 3:
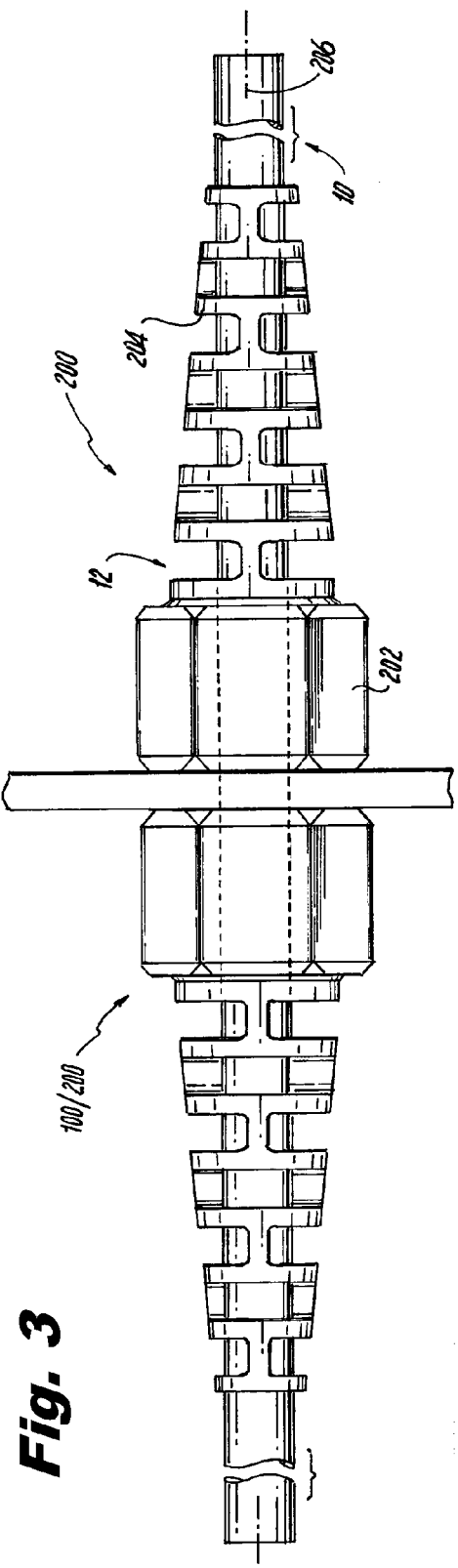
FIG. 3 is a side elevation view of another exemplary embodiment of a strain reliever, showing a tapered sleeve in the form of a slotted conic sleeve fitted to a tube extending through a bulkhead penetration.

Referring now to FIG. 3, a strain reliever 200 is shown. Strain reliever 200 includes a fitting 202 and a tapered sleeve 204 respectively aligned to one another on an axis 206. Strain reliever 200 is disposed on a distal end of a tube 10, fitting 202 being a threaded fitting dimensioned to fit at a distal end 12 of tube 10. Fitting 202 and tapered sleeve 204 may be fabricated fitting 102 and tapered sleeve 104, as described above. Fitting 202 and tapered sleeve 204 may also be coupled in the manner that fitting 102 and tapered sleeve 104 are coupled, as described above.

As further shown in FIG. 3, strain reliever 200 may couple tube segment 10 to a pass through extending through a bulkhead. Strain reliever 200 can also couple to an opposing strain reliever 100 or 200, such as by a threaded interface. As will be appreciated, the arrangement shown in FIG. 3 of opposing strain relievers coupling a continuous tube segment provides a bulkhead penetration with strain relief without interruption of, or discontinuity in, tube segment 10.

Figure 4:
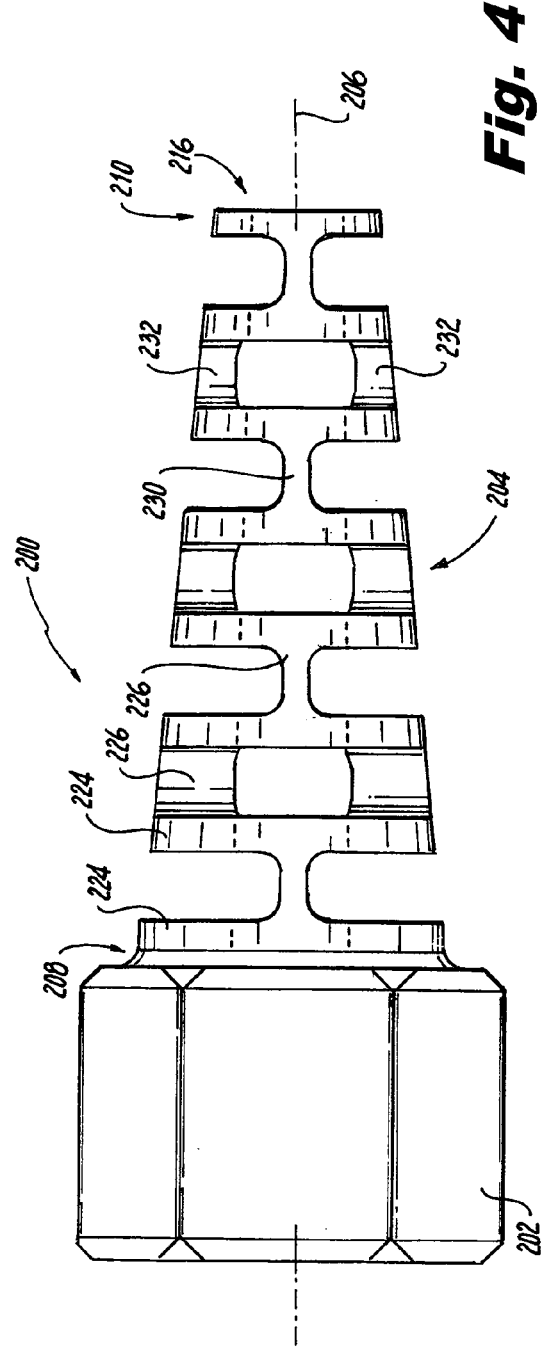
FIG. 4 is a side elevation view of the strain reliever of FIG. 3, showing the slotted conic sleeve.

FIG. 4 shows strain reliever 200 detached from tube 10. Sleeve 204 is a tapered sleeve extending proximally from fitting 202. Sleeve 204 defines a slotted conic profile extending along axis 206. Sleeve 204 extends proximally from fitting 202 between a first end 208 and a second end 210 along axis 206. Sleeve 204 is configured to surround distal end portion 12 of tube 10 (shown in FIG. 3) and to provide relief of strain exerted on the tube, such as by vibration or force applied orthogonally with respect to a tube axis for example.

Sleeve 204 is formed from a succession of aperture plates 224 separated by bridge plates 226 extending proximally from fitting 202. Each aperture plate 224 has a smaller outer diameter than its immediate predecessor positioned between it and fitting 202. Each respective pair of bridge plates has a smaller radial thickness than its immediate predecessor, sleeve 204 thereby having a conical form extending between first end 208 and 210. In the illustrated embodiment, eight aperture plates 224 are distributed along the length sleeve 204, each adjacent pair of aperture plates 224 being separated by a set of bridge plates 226 disposed on opposing sides of axis 206. As will be appreciated, strain relievers can have a smaller or a greater number of aperture and bridging plates as may be suitable for a given application without departing from the scope of the present invention.

Each aperture plate 224 has an aperture extending through the center of the plate and aligned to axis 206, and includes a proximal surface and a distal surface. The aperture of each aperture plate 224 has a constant diameter dimensioned to fit tightly around the distal end portion of tube 10 as shown in FIG. 3, thereby defining a central bore 216 extending through sleeve 204.

Each bridge plate 226 has a proximal and a distal end. Proximal ends of bridge plate pairs 226 couple to the distal surface of the adjacent aperture plate. Proximal ends of bridge plate pairs 226 couple to the proximal surface of the distal aperture plate. Axially successive pairs of bridge plates are radially offset with respect to one another, bridge pair 230 being offset 90° from bridge pair 232 for example. Alternating pairs of bridge plates are coplanar, thereby providing stiffness to sleeve 204 in two planes. Each pair of bridge plates defines a respective axial slot, the plurality of bridge plate pairs thereby defining a series of alternating slots formed along the length of sleeve 204.

FIG. 5 shows strain reliever 100 with a portion removed to illustrate stress distribution associated with a force exerted on tube 10. Reference letter A indicates a region of peak stress application to tube 10 in a conventional tube/fitting arrangement. Strain reliever 100 shifts the region of peak stress application from region A to a region C, region C being axially offset from region A by a distance 150. Strain reliever 100 further distributes, e.g. spreads out, the stress associated with the exerted force to region B of tube 10. Distributing the stress associated with a given force using strain reliever 100 reduces the maximum stress imposed on tube 10.

FIG. 6 shows strain reliever 200 with a portion removed to illustrate stress distribution associated with a force exerted on tube 10. Reference letter A indicates a region of peak stress application to tube 10 in a conventional tube/fitting arrangement. Strain reliever 200 shifts the region of peak stress application from region A to a region D, region D being axially offset from region A by a distance 250. Strain reliever further distributes the stress associated with the exerted force to region E of tube 10. As would further be appreciated, distributing the stress associated with a given force using strain reliever 200 similarly reduces the maximum stress imposed on tube 10.

Exemplary strain relievers having tapered sleeves operate to redistribute stress associated with a force exerted on tube 10 at a point along its length. Force exerted on a convention tube/fitting assembly typically induces peak stress at the tube end and adjacent the tube fitting. Embodiments of the strain reliever described herein redistribute the associated stress over the tube areas within which the tube sleeves contact the tube surface. In each above described embodiment, the effect of the redistribution is (a) to shift the point of greatest stress application distally, away from the fitting terminating the tube, and (b) decrease the peak magnitude of the stress imposed on the tube by the force. For example, as shown in FIG. 5, strain reliever 100 shifts the point of greatest stress application about 20% of the distance between the fitting and the point of force application, and decreases the peak stress to about 65% of the peak stress that would be experienced by a conventional tube. As shown in FIG. 6, strain reliever 200 shifts the point of greatest stress application about 10% of the distance between the fitting and the point of force application, decreasing the peak stress to about 80% of the stress that would be experienced by a conventional tube. Embodiments of the above described strain relievers can be used in high temperature environments, such as automotive and aerospace applications, where the tubes connect thermo-coupled or strain-gauged instruments or convey fluid or gaseous substances or any other suitable application. The tapered conical geometry of exemplary embodiments of the above described strain relievers, its length and arrangement about the tube from the tube termination point, and tightness about the tube spread the stress of a force that otherwise could shear the tube from its termination point. The arrangement and number or gaps, or size of helix or other geometry, could further be adapted for purposes of keeping strain relatively low and balanced along the length of the strain relief device. These devices are also suitable for ad hoc instrumentation installations where tubing need be installed without disturbing existing structure with tube fixation members, such as in high temperature environments where connections to thermocouples and strain gauges need be protected from the environment external to the tube segment, or where gases or fluids are conveyed within the tube segment.

While the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A strain reliever for a hollow tube for measurement instruments, comprising:
   a fitting dimensioned to fit at a tube segment, the fitting constructed from a brass or steel material;
   a tapered sleeve with a central bore extending proximally from the fitting, the tapered sleeve constructed from a brass or steel material and configured to surround the tube segment to provide relief of strain on the tube segment; and
   a rigid, thin-walled metal tube constructed from a steel material extending continuously through the fitting and tapered sleeve from an end of the tapered sleeve opposite the fitting to an end of the fitting opposite the tapered sleeve,
   wherein the tapered sleeve central bore has a diameter that is larger than an outside diameter of the metal tube to accommodate geometry change of the metal tube from thermal expansion while providing strain relief to a tube segment of the metal tube disposed within the tapered sleeve.

2. A strain reliever as recited in claim 1, wherein the tapered sleeve is in the form of a helical conic sleeve.

3. A strain reliever as recited in claim 1, wherein the tapered sleeve is in the form of a slotted conic sleeve.

4. A strain reliever as recited in claim 3, wherein the slotted conic sleeve has a series of alternating slots formed along a length thereof.

5. A strain reliever as recited in claim 1, wherein the fitting is dimensioned to fit a distal end of the tube segment, and wherein the tapered sleeve is configured to surround the distal portion of the tube segment to provide strain relief on the tube.

6. A strain reliever as recited in claim 1, wherein the fitting is coupled in the tapered sleeve by a brazed joint.

7. A strain reliever as recited in claim 1, wherein the fitting is coupled to the tapered sleeve by a welded joint.

8. A strain reliever as recited in claim 1, wherein the fitting is coupled to the tapered sleeve by a threaded interface.

9. A strain reliever as recited in claim 1, wherein the thin-walled metal tube extends continuously between an outer surface and an inner surface of the thin-walled metal tube, wherein the thin-walled metal tube extends continuously about a circumference of the thin-walled metal tube.

10. A strain reliever for measurement instruments, comprising:
    a fitting dimensioned to fit at a tube segment, the fitting constructed from a brass or steel material; and
    a tapered sleeve with a central bore extending proximally from the fitting, the tapered sleeve constructed from a brass or steel material and configured to surround the tube segment to provide relief of strain on the tube segment;
    a rigid, thin-walled metal tube constructed from a steel material extending continuously through the fitting and the tapered sleeve from an end of the tapered sleeve opposite the fitting to an end of the fitting opposite the tapered sleeve; and
    a welded or brazed joint connecting the tapered sleeve to the tube segment,
    wherein the tapered sleeve has a central bore with a constant diameter dimensioned to fit tightly around the tube segment to provide strain relief to a tube segment of the metal tube disposed within the tapered sleeve.

11. A strain reliever as recited in claim 10, wherein the tapered sleeve fits about the tube segment with an interference fit.

12. A strain reliever for measurement instruments, comprising:
    a fitting dimensioned to fit at a tube segment, the fitting constructed from a steel material;
    a tapered sleeve with a central bore extending proximally from the fitting, the tapered sleeve constructed from a steel material and configured to surround the tube segment to provide relief of strain on the tube segment; and
    a rigid, thin-walled metal tube constructed from a steel material extending continuously through the fitting and the tapered sleeve from an end of the tapered sleeve opposite the fitting to an end of the fitting opposite the tapered sleeve;
    wherein the tapered sleeve and metal tube are machined from a single piece of material such that the tapered sleeve is integrally formed in a surface of the tube segment.

13. A strain reliever as recited in claim 12, wherein the sleeve is configured and adapted to provide strain relief of the tube segment and for dimensional change in the tube segment.

14. A strain reliever as recited in claim 12, wherein the tapered sleeve includes a male threaded segment, wherein the fitting includes a female threaded segment, wherein the male threaded segment of the tapered is threadably received within the female threaded segment of the fitting.

15. A strain reliever arrangement for measurement instruments, comprising:
    a bulkhead with a pass through;
    a first strain reliever as recited in claim 1 seated in the pass through; and
    a second strain reliever seated in the pass through opposite the first strainer reliever and connected to the first strain reliever by a threaded interface,
    wherein the tube segment extends continuously without interruption or discontinuity through the first strain reliever, the pass through, and the second strain reliever,
    wherein the first strain reliever provides strain relief on a first side of the bulkhead and the second strainer reliever provides strain relief on an opposed second side of the bulkhead.

* * * * *